July 10, 1962 J. A. HERRMANN 3,044,036

BUS SUPPORT MEANS FOR LOW REACTANCE BUS DUCT

Filed Nov. 12, 1957 4 Sheets-Sheet 1

INVENTOR.
JOHN A. HERRMANN

BY Ostrolenk, Faber, Gerb & Soffen

ATTORNEYS

BUS SUPPORT MEANS FOR LOW REACTANCE BUS DUCT

Filed Nov. 12, 1957 4 Sheets-Sheet 2

INVENTOR.
JOHN A. HERRMANN

BY Ostrolenk, Faber, Gerb & Soffen

ATTORNEYS

July 10, 1962 J. A. HERRMANN 3,044,036

BUS SUPPORT MEANS FOR LOW REACTANCE BUS DUCT

Filed Nov. 12, 1957 4 Sheets-Sheet 3

INVENTOR.
JOHN A. HERRMANN

BY Ostrolenk, Faber, Gerb & Soffen
ATTORNEYS

July 10, 1962 J. A. HERRMANN 3,044,036

BUS SUPPORT MEANS FOR LOW REACTANCE BUS DUCT

Filed Nov. 12, 1957 4 Sheets-Sheet 4

INVENTOR.
JOHN A. HERRMANN

BY Ostrolenk, Faber, Gerb & Soffen
ATTORNEYS 3,044,036
BUS SUPPORT MEANS FOR LOW REACTANCE BUS DUCT John A. Herrmann, Grosse Pointe Farms, Mich., assignor, by mesne assignments, to I-T-E Circuit Breaker Company, Philadelphia, Pa., a corporation of Pennsylvania Filed Nov. 12, 1957, Ser. No. 695,636
7 Claims. (Cl. 339—22)

My invention relates to a novel support means for supporting a plurality of buses within a bus duct.

A bus bar arrangement for a multi-phase electrical distribution system has been shown in U.S. Patent 2,287,502 to A. A. Togesen et al., wherein a pair of conductors are provided for each phase and each bus or conductor is then placed in a close-spaced relationship with respect to another bus which, because of the geometric arrangement of the buses, carries a current which is displaced in phase by substantially 180° with respect to the first bus current.

Bus duct units constructed in accordance with the above principle have, as is shown in copending application Serial No. 658,773 filed May 13, 1957, now Patent No. 2,912,603, been designed in a ladder type arrangement wherein one bus is positioned on top of another.

Within each of the bus ducts the bus support means must be constructed so that the positioning of the buses with respect to one another will afford the low reactance characteristics, and further that the buses be appropriately altered in their geometric spacing at predetermined points along the bus housing so that plug-in connection to the buses may be made. That is to say, it is desirable that the bus support means maintains the buses of different phases in a close-spaced relationship for the desired low reactance characteristic, and yet allows an easy plug-in connection by existing plug-in equipment to bus of each phase.

A further requirement of this bus mounting means is that it be as simple and inexpensive as possible, while still being strong enough to withstand forces imparted to the buses during short circuit conditions.

The principle of my inventoin is to provide a plurality of pairs of insulator blocks within the duct housing wherein each of the insulator blocks have indentations therein for receiving and maintaining each respective bus bar in a predetermined geometric position with respect to all other bus bars. The blocks of each pair of insulator blocks are positioned within opposite halves of the bus housing and are positioned adjacent each side of the ladder arrangement of buses whereby each bus is supported between cooperating indentations in the opposing insulator blocks of each pair of insulator blocks when the two bus duct sections are fastened together. The fastening of the blocks is, in accordance with my novel invention, such that the blocks are forced toward one another in a direction perpendicular to the bus run and parallel to the plane of the bus.

Thus, the bus bars may be positioned in the most desirable geometric arrangement for a low reactance system. When, however, a plug-in position is reached by the bus, this plug-in position will be free of the mounting means whereby the buses may have their positions altered so as to assume positions for cooperating with previously existing plug-in type of equipment.

Thus, my novel bus support means gives rigid, reliable support to the buses and maintains the buses in a low reactance geometric relatoinship, while it still allows, between support position, room wherein the bus positions may be altered to allow the use of presently existing plug-in type equipment.

Furthermore, my novel bus support means are simple in construction and reliable in operation, and may be easily connected at any installation.

While my invention is described hereinafter in conjunction with a low impedance bus unit, my novel invention is a bus support means which is applicable in any bus duct system.

In one embodiment of my invention each pair of mounting blocks or bus supports is positioned within the bus duct housing and a bolt means which passes through cooperating apertures in the bus supports clamps the supports together. This construction affords the desirable possibility of assembling the buses and bus supports prior to assembling the housing.

In another embodiment of my invention, each of the bus duct halves may have lanced ears which will receive and maintain the bus supports in a fixed position once the bus supports are put in place. Here, however, the support means for maintaining the bus supports in place does not play any part in the assembly of the bus duct unit, and all of the physical strength for this function comes from fastening means connected to protruding flanges of the bus housing.

Accordingly, a primary object of my invention is to provide a novel bus support means.

Another object of my invention is to provide a novel bus support means for maintaining a plurality of buses in predetermined geometrical positions within a bus housing wherein clamping force is provided in a direction which is parallel to the plane of the buses.

Another object of my invention is to provide a novel bus support means for a low reactance plug-in type bus system.

A further object of my invention is to provide a novel support means for supporting a plurality of ladder arranged buses within a bus housing wherein each ladder arrangement is adjacent an opposite ladder arrangement.

Another object of my invention is to provide a novel support means for supporting a plurality of buses within a bus housing so as to offer a low reactance system and still allow the utilization of presently existing plug-in equipment.

Another object of my invention is to provide a simple and inexpensive bus support means for a low reactance plug-in bus wherein axially displaced pairs of adjacent support members have indentations therein clamped upon the opposite sides of the buses.

A still further object of my invention is to provide a novel bus support means wherein insulated support members are fastened to the bus housing by a lanced ear means in the bus housing.

These and other objects of my invention will become apparent from the following description taken in conjunction with the drawings in which:

FIGURE 9 is a view similar to FIGURE 7 showing a staggered support arrangement for two sets of ladder arranged buses.

Figure 1:
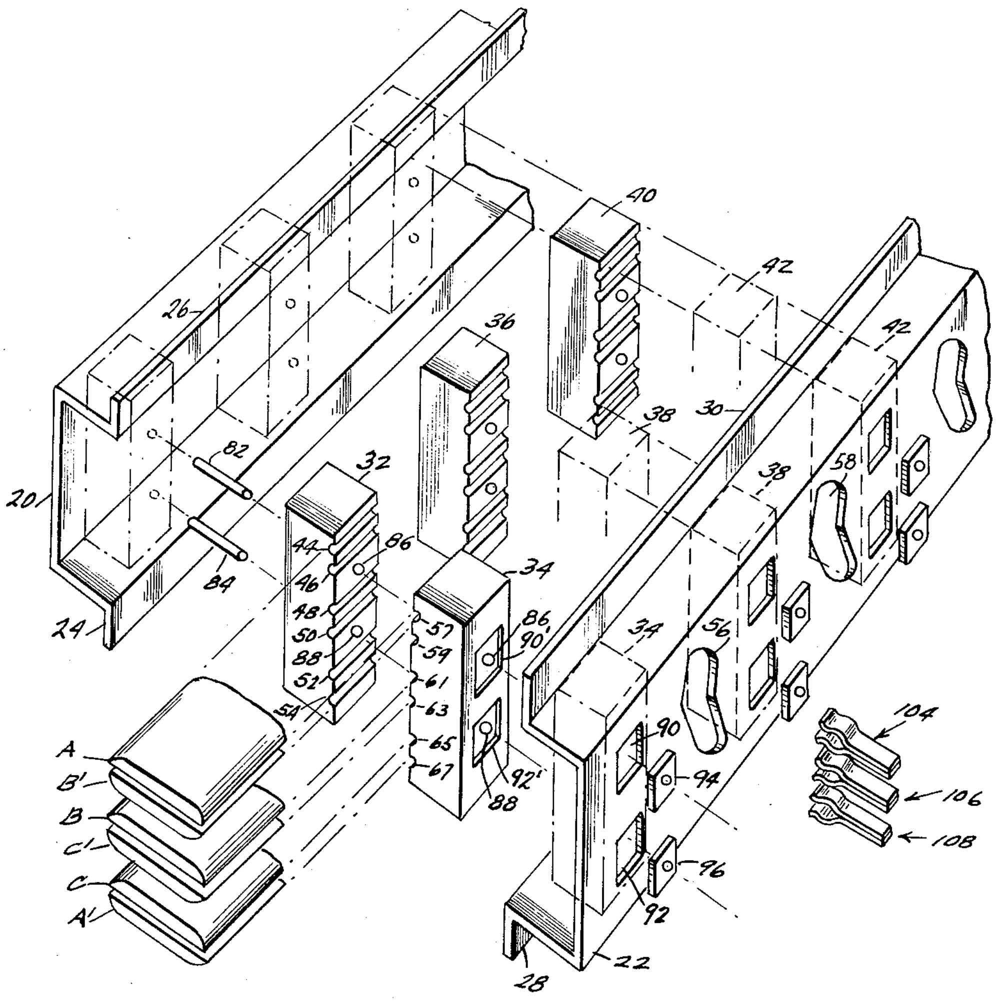
FIGURE 1 is an exploded perspective view of a bus duct unit having support means constructed in accordance with my invention.

Referring now to FIGURE 1 which shows a fragmentary portion of the bus duct unit, the bus duct unit is comprised of housing sections 20 and 22, each of which have flanged portions 24—26 and 28—30 respectively. Flanges 26 and 30 and flanges 24 and 28 cooperate with bolt means for assembling the bus housing as a unit, as will be shown more fully hereinafter.

Contained within the bus housing and to be supported therein by my novel bus support means are the buses identified as A, B′, B, C′, C and A′.

It is to be understood that buses A and A′ are connected to a first phase of a multi-phase system, while buses B and B′ and C and C′ are similarly connected to a second and third phase of a multi-phase system.

In accordance with the invention of the above noted Togesen patent, when buses A—B′, B—C′, and C—A′ are connected relatively close to one another and relatively close with respect to the spacing between the pairs of buses, there will result a low reactance system.

It is, however, necessary for plug-in purposes that at least one of the buses of each of the phases be spaced sufficiently far from buses of different phases so that accidental short circuiting during plug-in connection will not be made. That is, the close spacing of buses such as buses A and B′, which is desirable for a low reactance system, is undesirable at the area of plug-in connection, since it could afford accidental short circuiting of phases A and B by the plug-in connector.

Accordingly, I have provided a novel support means for rigidly maintaining the buses of FIGURE 1 in their low reactance positions while still allowing the bus positions to be altered at plug-in locations for receiving plug-in connectors without the danger of accidental short circuiting of extremely close spaced buses of different phases.

Thus, in FIGURE 1 I have shown a portion of a bus duct unit as containing three pairs of my novel bus support members 32—34, 36—38, and 40—42 respectively. Each of the bus support members, as is best seen in FIGURE 1 for the case of support member 32, has depressions such as 44, 46, 48, 50, 52 and 54 so dimensioned as to receive at least a portion of the left-hand side of buses A, B′, B, C and A′ respectively.

In a similar manner, bus support member 34 is provided with depressions partially seen in FIGURE 1 as depressions 57, 59, 61, 63, 65 and 67 which are constructed to receive the right-hand side of buses A, B′, B, C′, C and A′ respectively.

Clearly, when each of the buses are in position and bus support members 32 and 34 are clamped together in the manner to be set forth hereinafter, the buses will be rigidly maintained in a geometric relationship given by the spacing of the various apertures in support members 32 and 34 because of the engagement of the bus by the depressions in the bus support members.

It is also clear that the axially displaced bus support pairs 36—38 and 40—42 will be constructed in a manner identical to the construction set forth for bus supports 32 and 34.

While FIGURE 1 shows three pairs of bus supports for the various buses, it is to be understood that the number of bus supports and their spacing will be determined from the characteristics of a particular installation.

Since the bus support pairs are axially displaced in FIGURE 1, it is apparent that the bus position between bus support pairs may be altered to allow some desired spacing of the buses for cooperation with presently existing plug-in connection equipment.

Figure 2:
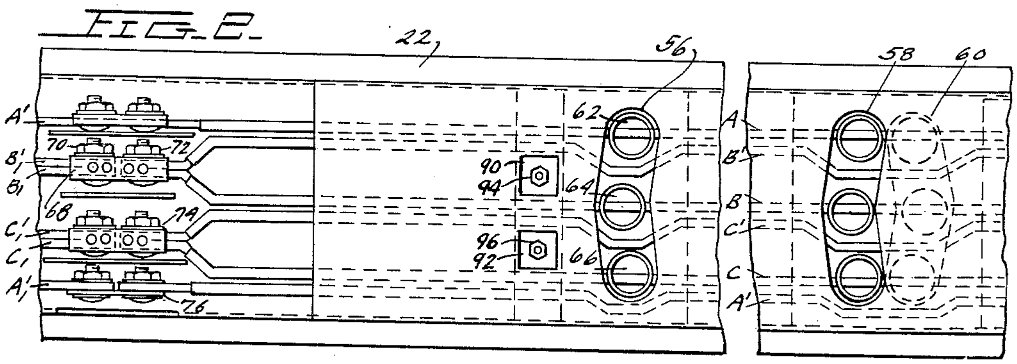
FIGURE 2 is a side view of a bus duct unit having the bus positions altered from their normal low reactance position for receiving plug-in connectors.

This may be better seen in FIGURE 2 which shows a side view of a ladder type bus arrangement of buses A, B′, B, C′, and C and A′ which are the same buses as those shown in FIGURE 1. FIGURE 2 further shows the positioning of kidney shaped apertures 56 and 58 in housing 22 which allow access to the bus conductors, and a similar kidney shaped aperture 60 is provided in the other housing half 20 for allowing plug-in access from the other side of the bus duct.

In order to provide adequate spacing between buses of different phases to thereby prevent any possible short circuiting during a plug-in operation, buses B′, C′ and A′ are downwardly displaced at the axial locations given by plug-in openings 56, 58 and 60. It will be apparent that alternate buses of the other embodiments to be hereinafter described are provided with similar downwardly displaced portions positioned adjacent to the plug-in openings.

Thus, the plug-in connectors (not shown), which include the hollow insulated rods 62, 64 and 66 shown in opening 56, will have adequate space as well as adequate separation between buses of opposite phases.

It is to be noted at the left-hand side of FIGURE 2 that the buses A, B′, B, C′, C and A′ are connectable to an adjacent bus duct unit which includes buses $A_1$, $B_1'$, $B_1$, $C_1'$, C, $C_1$ and $A_1'$ in the manner set forth in the aforesaid patent.

That is to say, a U-shaped jumper 68 electrically and mechanically interconnects buses $B_1'$, B, $B_1$ and B′, these buses being off-set to facilitate this connection by a bolt means such as the bolts 70 and 72. In a similar manner, buses $C_1$, $C_1'$, C and C′ are interconnected by the jumper 74, while buses $A_1'$, $A_1$, A′ and A are connected by a long jumper 76.

Clearly, the buses in the left-hand unit of FIGURE 2 will be supported within their own housing by a support means similar to that described herein for the right-hand bus unit.

Figures 4, 5, 6:
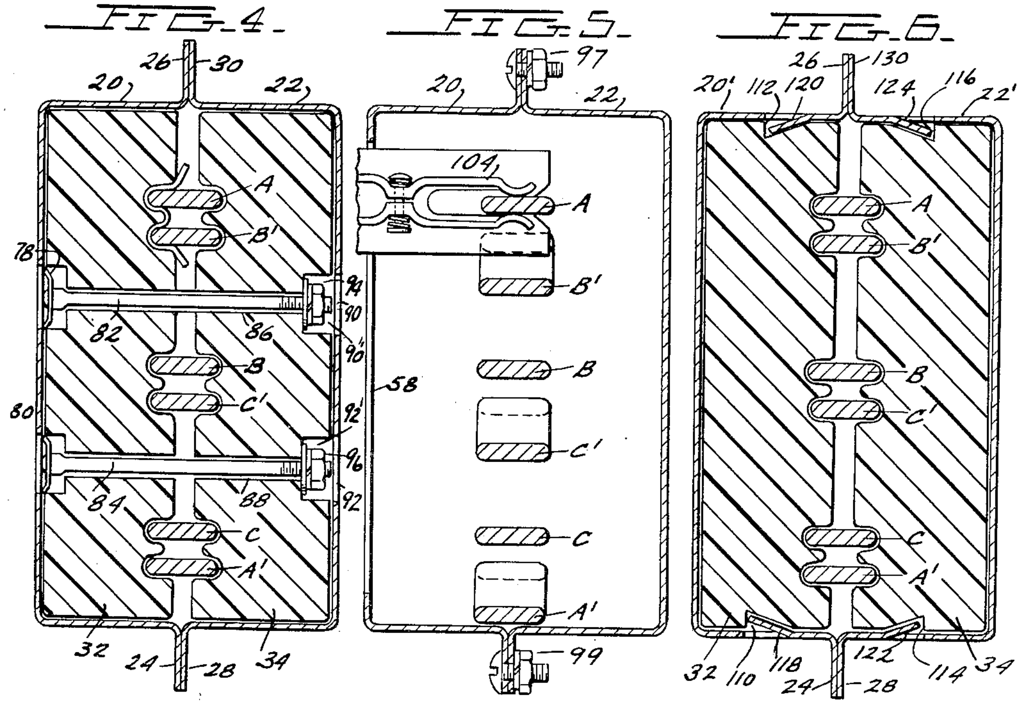
FIGURE 4 is a cross-sectional view of FIGURE 3 when taken across the linest 4—4, and particularly illustrates the use of a bolt clamping means for assembling the bus support members, the buses and the bus housing.
FIGURE 5 is a cross-sectional view of FIGURE 3 when taken across the lines 5—5, and particularly illustrates the manner in which the buses are altered to receive plug-in connectors.
FIGURE 6 is similar to FIGURE 4 wherein lanced ear means are utilized to maintain the bus supports in place within the bus housing.
Figure 3:
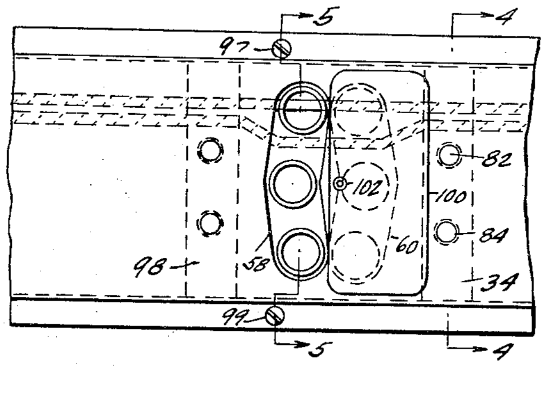
FIGURE 3 shows a portion of the bus duct of FIGURE 2 when adapted in accordance with my novel invention.

The manner in which the bus support means are fastened to the bus housing is best seen with reference to FIGURES 1, 3 and 4. In these FIGURES, and specifically in FIGURE 4, bus duct half 20 has embossments at predetermined points along its length such as embossments 78 adn 80 which can receive bolt members such as bolts 82 and 84 respectively, with the bolt heads being impinged upon the outer surface of the embossments. The bolts pass through apertures 86 and 88 respectively of bus support 32, as is best seen in FIGURES 1 and 4, and into similar holes or apertures 86 and 88 respectively of the other bus support 34 of the pair of bus supports 32 and 34. The other half of the bus duct housing 22 is provided with apertures 90 and 92 which receive the end of bolts 82 and 84 respectively, and allow the connection of nuts 94 and 96 respectively from the outside of bus duct half 22 for fastening bolts 82 and 84 in position with nuts 94, 96 disposed within depressions 90′, 92′, respectively, of bus support 34. It is noted that the shanks of screws 82, 84 are flattened to cooperate with similarly shaped apertures at the centers of embossments 78, 80 to prevent rotation of screws 82, 84 as nuts 94, 96 are being applied.

After the bolts 82 and 84 have been so connected the flanges of the bus housing halves 20 and 22 may be rigidly secured to one another by fastening means such as the nut and bolt arrangements 97 and 99 in FIGURES 3 and 4, this type of fastening arrangement being positioned all along the cooperating flanges of the bus housing halves.

It is to be noted that this novel system of fastening a bus support member to the housing and, at the same time, fasten the ladder type bus in a fixed position, is accomplished by the use of two simple bolts (or only one bolt, if desired) which are operable externally of the bus housing. Furthermore, the bolts place the various components of the bus support means in compression and are relatively free from trouble due to dimensional differences in the various components. That is, both bus supports 32, 34 are secured to only one housing half 20 so that the manufacturing tolerances of housing half 22 do not effect bus bar support. In addition this permits all of the bus bars to be secured prior to joining housing halves 20, 22.

As seen in FIGURE 3, another pair of bus supports are positioned at locations 98 while FIGURE 1 shows the further axially displaced pairs of bus support members 36—38 and 40—42. Clearly, each of the other support pairs such as supports 36—38 and 40—42 are connectable to bus housing half 20 so as to clamp the various bus bars in a manner identical to that above described for support pair 32 and 34.

Since the bus support pairs are longitudinally displaced, it is now possible to alter the bus positions between the mounting points and at plug-in locations along the bus duct unit so that previously existing plug-in equipment may be utilized without accidental phase to phase short circuits. This may be best seen in FIGURES 2 and 3 which show buses B′, C′ and A′ as being downwardly displaced in the region of the kidney shaped opening 58 which, as seen in FIGURE 1, is in duct half 22, and the kidney shaped opening 60 which would be in duct half 20 of FIGURE 1.

It is to be noted that FIGURE 3 further shows a hand hole cover 100 which is pivotally mounted to duct half 22 at the pivot point 102 and operates to cover the kidney shaped opening 58 when plug-in equipment is not being utilized at this point.

Reference to FIGURE 1, and particularly to FIGURE 5, shows the effect of spacing the bus bars in the manner shown in FIGURE 3 at plug-in locations. More specifically, FIGURE 1 schematically illustrates the plug-in equipment as comprising the connectors 104, 106 and 108 which are connectable to phases B, C and A respectively. Since, however, in the low reactance positioning of the bus bars phase B, for example, is immediately adjacent phase A, the connectors 104 could possibly short circuit phases A and B.

In accordance with my novel invention, however, I have found a method of mounting the bus bars which still allows the buses of dissimilar phase such as buses A and B to be spaced from one another at the plug-in locations, as is set forth in FIGURES 3 and 5.

Clearly, the bus bars which are normally insulated with a tape wrapping will be stripped of their insulated tape at these plug-in locations. This, however, does not increase the danger of a phase to phase flashover since the buses of different phases at the plug-in locations are spaced further away from one another to thereby increase flashover voltage at these points.

While the structure set forth hereinbefore shows the bus support pairs as being supported from a bolt member which passes through one duct wall and terminates in the opposite support member to thereby place the bus supports in a rigid compressional engagement with respect to the bus bars there are other methods by which a bus support could be fastened to the housing.

By way of example, FIGURE 6, which is similar to FIGURE 4, shows the bus supports 32 and 34 as having indented portions 110—112 and 114—116. The tops and bottoms of duct halves 20′ and 22′ are punched to form lanced ears 118, 120, and 122, 124 respectively, where the lanced ear 118 engages indented portions 110, while lanced ear 120 engages indented portion 112 of bus support 32′ to thereby rigidly maintain bus support 32′ to the housing 20′.

In a similar manner, lanced ears 122 and 124 of bus duct half 22′ engage indented portions 114 and 116 respectively of bus support 34′ so as to rigidly maintain bus support 34′ to the housing 22′.

In order to assemble the various buses in the manner set forth in FIGURE 4, it is now only necessary to tighten the fastening means attached to the flanges of the bus duct halves 20′ and 22′ such as the fastening means 97 and 99 of FIGURE 5 and thereby force bus supports 32′ and 34′ against the bus bars in a direction parallel to the bus surface. It is understood that similar types of fastening means are distributed along the length of these flanges so as to achieve a secure connection between the bus bars and the bus duct halves.

Figure 8:
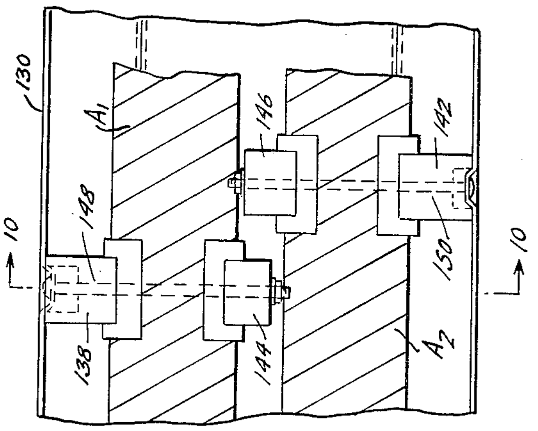
FIGURE 8 shows a side cross-sectional view of FIGURE 7 when taken along the lines 8—8.
Figure 7:
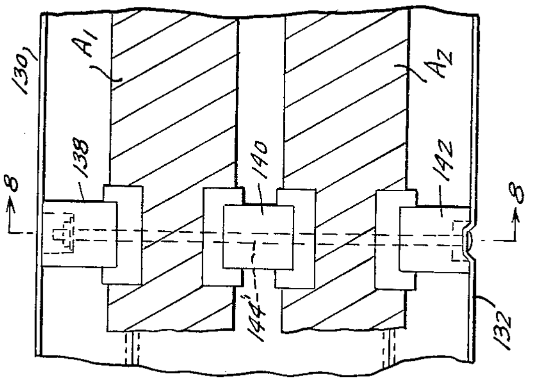
FIGURE 7 shows a top view of a further embodiment of my novel invention wherein a first and second set of ladder arranged buses are supported within a single housing.

FIGURES 7 and 8 illustrate a further embodiment of my invention as used for a bus duct system which contains a first and second system of ladder arranged buses.

The first and upper ladder system of FIGURES 7 and 8 comprise the buses $A_1$, $B_1$, $B_1'$, $C_1$, $C_1'$, $A_1'$ and two neutral buses $n_1$ and $n_1'$. The second and lower ladder system is comprised of buses $A_2$, $B_2$, $B_2'$, $C_2$, $C_2'$, $A_2'$ and the two neutral buses $n_2$ and $n_2'$.

Each of the above ladder bus systems are positioned within a housing comprised of standard bus duct halves 130 and 132 which are connected together by longitudinal filler plates 134 and 136 in the manner best seen in FIGURE 8.

In accordance with my novel invention, and as seen in FIGURE 7 and FIGURE 8, I provide three bus support members 138, 140 and 142, each of which are constructed in the manner shown for bus support member 32 of FIGURE 1. Thus, bus support members 138 and 140 form a pair of bus supports for the ladder system including bus bar $A_1$ while bus support members 140 and 142 form a pair of bus support members for supporting the ladder system including bus bar $A_2$.

A single bolt member such as bolt member 144′ is then passed through the side of housing 132, bus supports 142 and 140 and is terminated in bus support 138. Clearly, the bolt member 144′ is operable externally of the bus duct housing for forcing bus support pairs 138—140 and 140—142 into compression to produce a holding force on their respective ladder systems which is in a direction parallel to the surface of the bus and in a direction perpendicular to the bus run.

Figure 10:
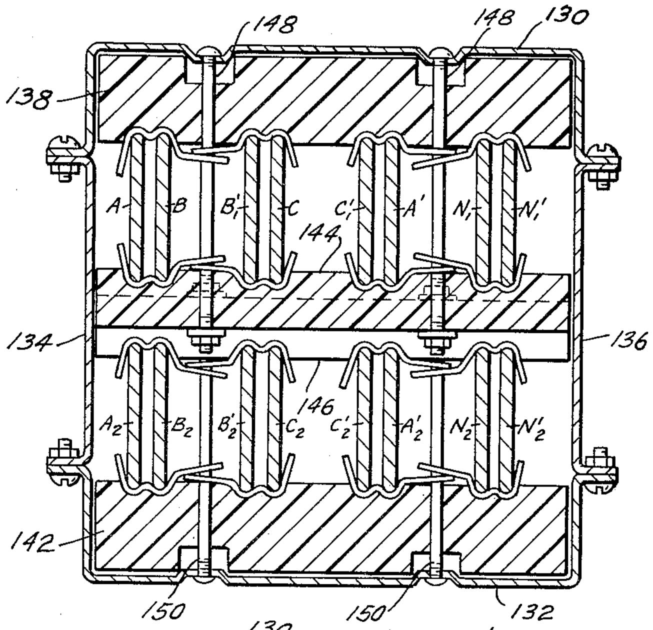
FIGURE 10 is a cross-sectional view of FIGURE 7 when taken along line 10—10.
Figure 8:
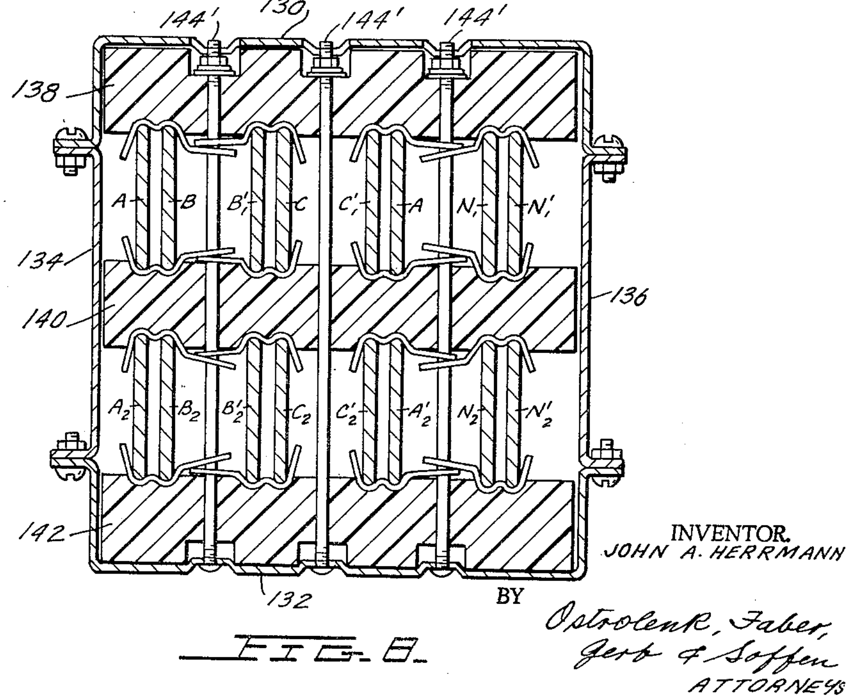

While the above description shows how three bus supports in an in-line configuration can support the two ladder systems of FIGURES 7 and 8, it would be equally possible to use a staggered configuration as seen in FIGURES 9 and 10.

In this case, the bus support 138′ is positioned opposite bus support 144 to support the ladder arrangement including bus $A_1$. Similarly, bus support 142′ is positioned opposite bus support 146 to support the ladder arrangement including bus bar $A_2$.

The bus support members 138′ and 144 are clamped together by means of bolts 148 which pass through the duct half 130 and bus support 138′ and is terminated in bus support 144. In a similar manner, the bus support members 142′ and 146 are clamped together by means of bolts 150 which pass through bus duct half 132, bus support 142′ and is terminated in support member 146.

Thus, as in the case of the in-line clamping method, in the staggered support method, the buses are clamped together by means which are operable externally of the bus housing, and the clamping force is parallel to the surface of the bus bars. It is noted that the ladder arrangement including bus bar A, is not secured to duct half 132 by bus supports 138′, 144 and the ladder arrangement including bus bar $A_2$ is not secured to duct half 130 by bus supports 142′, 146. Clearly, both the staggered supporting and in-line supporting of FIGURES 7 and 9 are susceptible to substantially all of the modifications above described in the support of a single ladder arrangement.

Although I have described preferred embodiments of my novel invention, many variations and modifications will now be obvious to those skilled in the art, and I prefer therefore to be limited not by the specific disclosure herein but only by the appended claims.

I claim:

1. In a low reactance bus duct unit comprising an elongated housing means, a first and second bus for each phase of a three phase source, said buses being positioned within said housing means in a ladder type arrangement, said buses being paired off with buses of different phases to give a low reactance system, a plurality of pairs of bus support members, each bus support member of each pair of bus support members being positioned opposite one another and on opposite sides of said plurality of buses, each of said pairs of bus support members being displaced from one another in the direction of the bus run; each of said bus support members having indentations in their surfaces facing said plurality of buses for receiving a portion of each of said plurality of buses; and respective support means for supporting each of said pairs of bus support members from said housing means and for forcing said indented surface portions of said bus support members into supporting relationship with respect to said plurality of buses; each of said supporting means comprising at least one bolt member passing through one side of said housing means and connecting each of said bus support members; each of said bolt members terminating before engagement with another side of said housing means opposite said one side; said housing means comprising a first U-shaped member and a second U-shaped member whose arms extend toward the arms of said first U-shaped member and are spaced therefrom; said one side comprising the web of the first U-shaped member and said another side comprising the web of the second U-shaped member; filler plates connecting each of the U-arms of the first U-shaped member to the U-arms of the second U-shaped member; said first and said second buses of each phase being spaced apart by a distance less than the spacing between buses of adjacent phases; said first buses having laterally offset portions located adjacent ones of said pairs of bus support members to permit connection of said second buses of each phase with plug-in equipment.

2. In a low reactance bus duct unit comprising an elongated housing means, a first and second bus for each phase of a three phase source, said buses being positioned within said housing means in a ladder type arrangement, said buses being paired off with buses of different phases to give a low reactance system, a plurality of pairs of bus support members, each bus support member of each pair of bus support members being positioned opposite one another and on opposite sides of said plurality of buses, each of asid pairs of bus support members being displaced from one another in the direction of the bus run; each of said bus support members having identations in their surfaces facing said plurality of buses for receiving a portion of each of said plurality of buses; and respective support means for supporting each of said pairs of bus support members from said housing means and for forcing said indented surface portions of said bus support members into supporting relationship with respect to said plurality of buses; each of said supporting means comprising at least one bolt member passing through one side of said housing means and connecting each of said bus support members; each of said bolt members terminating before engagement with another side of said housing means opposite said one side; a third and a fourth bus within the housing means for each of the phases; all of said third and said fourth buses being paired off with buses of different phases to give a low reactance system; said third and said fourth buses being positioned by an additional plurality of pairs of bus support members and respective cooperating supporting means of substantially the same construction as the bus support members and supporting means previously recited; each of the last recited supporting means comprising at least one bolt member passing through said another side and terminating before engagement with said one side; said pairs of support members for said first and second buses being staggered with respect to the pairs of support members for said third and fourth buses; said first and said second buses of each phase of said three phase source being spaced apart by a distance less than the spacing between buses of adjacent phases; said first buses having offset portions located adjacent ones of said pairs of bus support members to permit connection of said second buses of each phase with plug-in equipment.

3. A bus duct unit comprising a plurality of buses in ladder type low impedance arrangement housed within a housing means; at least half of said buses being insulated from the remaining buses; a plurality of pairs of bus support members; each bus support member of each pair of bus support members being positioned opposite one another and on opposite sides of said plurality of buses, each of said pairs of bus support members being displaced from one another in the direction of the bus run; each of said bus support members having indentations in their surfaces facing said plurality of buses for receiving a portion of each of said plurality of buses; means for each of said pairs of bus support members for forcing said indented surface portions of said bus support members into supporting relationship with respect to said plurality of buses; said means applying the force in a direction parallel to the surface of said buses; said means securing said bus support members and said buses to a single surface of said housing means; said housing means including a first and a second U-shaped member of substantially identical cross-section each having outwardly projecting flanges at the end of the U-arms with the U-arms of the said first member extending toward the U-arms of the second member in alignment therewith; said single surface comprising the web of said first members; alternate ones of said buses having laterally offset portions positioned between adjacent pairs of bus support members to permit connection of the remaining buses with plug-in equipment.

4. A bus duct unit comprising a plurality of buses in ladder type arrangement housed within a housing means; a plurality of pairs of bus support members; each bus support member of each pair of bus support members being positioned opposite one another and on opposite sides of said plurality of buses, each of said pairs of bus support members being displaced from one another in the direction of the bus run; each of said bus support members having indentations in their surfaces facing said plurality of buses; means formed integrally with said housing means for fastening each support member of each of said plurality of support members to opposite sides of said housing means, further assembling means for forcing said support members into engagement with said plurality of bus bars, said buses arranged in pairs in a low impedance arrangement with the spacing between buses in each pair of buses being less than the spacing between adjacent ones of said pairs of buses, a first bus of each pair of buses having laterally offset portions located between adjacent pairs of said pairs of bus support members to provide means for connecting plug-in equipment.

5. A bus duct unit comprising a plurality of buses in ladder type arrangement housed within a housing means; a plurality of pairs of bus support members; each bus support member of each pair of bus support members being displaced from one another in the direction of the bus run; each of said bus support members having indentations in their surfaces facing said plurality of buses for receiving a portion of each of said plurality of buses; and respective support means for supporting each of said pairs of bus support members from said housing means and for forcing said indented surface portions of said bus support members into supporting relationship with respect to said plurality of buses said bus housing having openings therein for allowing connection of plug-in equipment to said buses; said support members being removed from the position of said openings, said buses arranged in pairs in a low impedance arrangement with the spacing between buses in each pair of buses being less than the spacing between adjacent ones of said pairs of buses, a first bus of each pair of buses having laterally offset portions located between adjacent pairs of said pairs of bus support members to provide means to permit connection of a second bus of each pair with plug-in equipment, said laterally offset portions positioned adjacent to said openings.

6. A bus duct unit comprising a plurality of buses in ladder type arrangement housed within a housing means; a plurality of pairs of bus support members, each bus support member of each pair of bus support members being positioned opposite one another and on opposite sides of said plurality of buses, each of said pairs of bus support members being displaced from one another in the direction of the bus run; each of said bus support members having indentations in their surfaces facing said plurality of buses for receiving a portion of each of said plurality of buses; means formed integrally with said housing means for fastening each support member of each of said plurality of pairs of bus support members and further assembling means for forcing said support members into engagement with said plurality of bus bars; said bus housing having openings therein for allowing connection of plug-in equipment to said buses; said support members being removed from the position of said openings, said buses arranged in pairs in a low impedance arrangement with the spacing between buses in each pair of buses being less than the spacing between adjacent ones of said pairs of buses, a first bus of each pair of buses having laterally offset portions located between adjacent pairs of said pairs of bus support members to provide means for connecting plug-in equipment, said laterally offset portions positioned adjacent to said openings.

7. In a low reactance bus duct unit comprising an elongated housing means, a first and second bus for each phase of a three phase source, said buses being paired off with buses of different phases to give a low reactance system, a plurality of pairs of bus support members, each bus support member of each pair of bus support members being positioned opposite one another and on opposite sides of said plurality of buses, each of said pairs of bus support members being displaced from one another in the direction of the bus run; each of said bus support members having indentations in their surfaces facing said plurality of buses for receiving a portion of each of said plurality of buses; and respective support means for supporting each of said pairs of bus support members from said housing means and for forcing said indented surface portions of said bus support members into supporting relationship with respect to said plurality of buses; each of said supporting means comprising at least one bolt member passing through one side of said housing means and connecting each of said bus support members; each of said bolt members terminating before engagement with another side of said housing means opposite said one side; each of said bolt members being tightened externally of said housing means; said bus housing having openings therein for allowing connection of plug-in equipment to said bus; said support members being remote from the position of said openings, said buses arranged in pairs in a low impedance arrangement with the spacing between buses in each pair of buses being less than the spacing between adjacent ones of said pairs of buses, a first bus of each pair of buses having laterally offset portions located between adjacent pairs of said pairs of bus support members to provide means for connecting plug-in equipment, said laterally offset portions positioned adjacent to said openings.

References Cited in the file of this patent

UNITED STATES PATENTS

| | | |
|---|---|---|
| 1,697,317 | Kyle | Jan. 1, 1929 |
| 1,719,363 | Gaynor | July 2, 1929 |
| 2,084,580 | Frank | June 22, 1937 |
| 2,310,919 | Adam | Feb. 16, 1943 |
| 2,318,859 | Huguelet | May 11, 1943 |
| 2,322,799 | Frank | June 29, 1943 |
| 2,339,600 | Carlson et al. | Jan. 18, 1944 |
| 2,435,113 | Adam | Jan. 27, 1948 |
| 2,482,310 | Adam | Sept. 20, 1949 |
| 2,653,991 | Dyer et al. | Sept. 29, 1953 |
| 2,725,541 | Born et al. | Nov. 29, 1955 |

FOREIGN PATENTS

| | | |
|---|---|---|
| 149,340 | Australia | Dec. 8, 1952 |
| 746,318 | Germany | Aug. 1, 1944 |
| 930,770 | France | Apr. 25, 1947 |